United States Patent [19]

Stähle

[11] 4,350,320

[45] Sep. 21, 1982

[54] VALVE, ESPECIALLY A SOLENOID VALVE

[75] Inventor: Kurt Stähle, Steinegg, Fed. Rep. of Germany

[73] Assignee: Concordia Fluidtechnik GmbH, Stuttgart, Fed. Rep. of Germany

[21] Appl. No.: 100,961

[22] Filed: Dec. 6, 1979

[30] Foreign Application Priority Data

Dec. 9, 1978 [DE] Fed. Rep. of Germany ....... 2853231

[51] Int. Cl.³ ............................................. F16K 31/06
[52] U.S. Cl. ................................ 251/129; 251/DIG. 2
[58] Field of Search ......................... 251/DIG. 2, 129

[56] References Cited

U.S. PATENT DOCUMENTS

| | | | |
|---|---|---|---|
| 70,511 | 11/1867 | Bourden | 251/DIG. 2 X |
| 3,773,077 | 11/1973 | Barnebey | 251/DIG. 2 X |
| 3,905,576 | 9/1975 | Fox, Jr. | 251/DIG. 2 X |
| 4,084,617 | 4/1978 | Happe | 251/DIG. 2 X |

FOREIGN PATENT DOCUMENTS 1650394 8/1970 Fed. Rep. of Germany ... 251/DIG. 2

Primary Examiner—Arnold Rosenthal
Attorney, Agent, or Firm—Craig and Antonelli

[57] ABSTRACT

A valve for controlling the inlet and outflow of fluid into a housing chamber is provided. In order to minimize the forces necessary to move the sealing body, while also assuring a reliable sealing of inlet and outlet openings on a sealing surface of the valve housing, the sealing bodies are constructed of elastic flexible loops that are unrollable over the sealing surface. In particularly preferred embodiments, magnetic means are provided for selectively moving the sealing body to open and close the respective openings.

22 Claims, 13 Drawing Figures

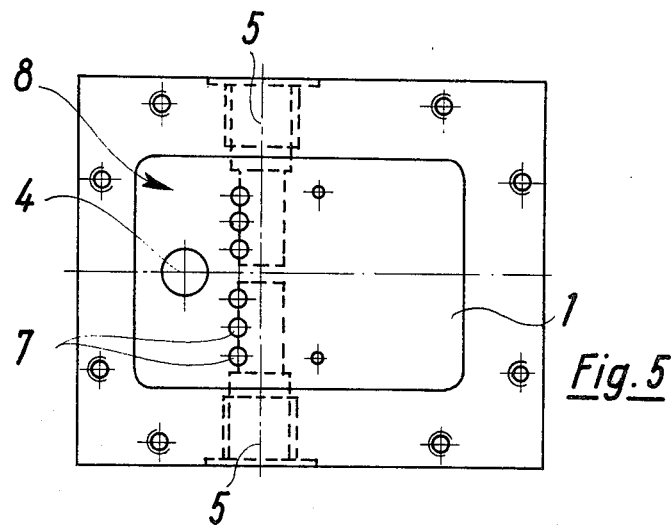
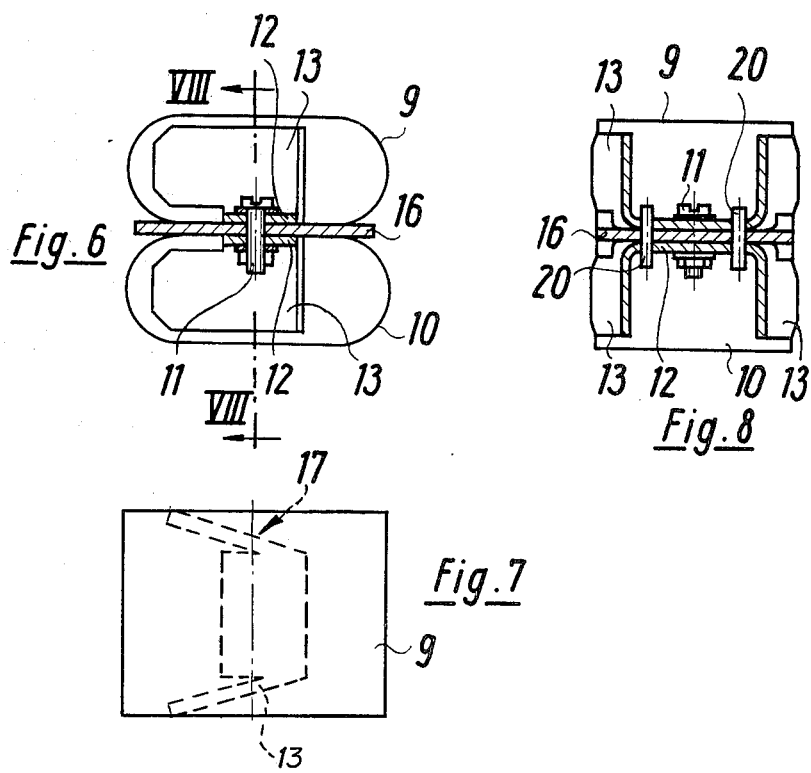

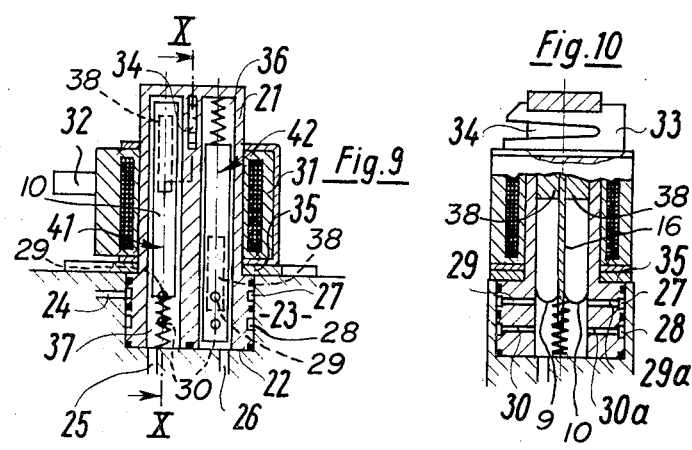
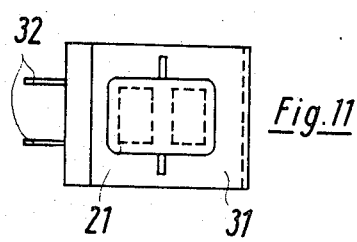
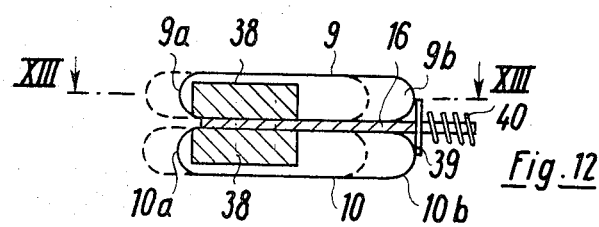
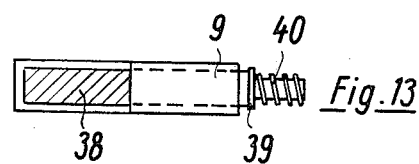

VALVE, ESPECIALLY A SOLENOID VALVE

BACKGROUND AND SUMMARY OF THE INVENTION

The invention relates to a valve, especially a solenoid valve with a controllably movable valve body, said body cooperating with inlet or outlet openings for a flowing medium, said openings being provided in a housing or the like.

Many solenoid valves are known (German Offenlegungsschrift No. 18 06 040), wherein conical valve bodies cooperate with corresponding valve seats. There is limited flexibility in such designs because the masses become too great at large nominal widths. In particular, valves which open when a magnet is energized also suffer from problems relating to the magnetic forces to be transmitted and to the required stroke. For this reason, so-called plate valves have been used for solenoid valves (German Offenlegungsschrift No. 26 50 393), wherein flat, membrane-like valve bodies cooperate with corresponding seats. However, manufacture of such valves is not simple. The same remarks that were made regarding the valve designs mentioned hereinabove also apply to the transmission of magnetic forces and the length of the stroke.

An object of the invention is to design a valve in such a manner that the actuating force can be kept as small as possible even when controlling large nominal widths, so that small magnet units which can be manufactured at negligible expense can be used as actuating elements when electromagnets are used.

The invention contemplates an arrangement wherein the valve body is designed as a sealing body unrollable (sealing body can be unrolled from its rest position) on a surface containing the inlet and outlet openings. The fact that, according to the invention, the sealing body need not be lifted off the valve seat, but is merely unrolled over the latter, means that extremely small actuating forces will suffice to ensure the opening or closing of the inlet or outlet openings.

In advantageous preferred embodiments of the invention, the sealing body comprises a strip of sealing material, and the strip is made in the form of an annular loop of elastic material, said loop being unrollable on a sealing plane containing the inlet or outlet openings. This design makes it possible to avoid using roller bodies or the like, so that the total mass to be moved can be kept as small as possible. Valves of this type are therefore especially suitable for electromagnetic actuation, assuming no large magnetic forces and therefore no large magnet parts.

The annular loop can advantageously be guided between the sealing plane and a matching plane, the distance between which is smaller than the diameter of the annular loop. Consequently, the annular loop is pressed into an oval shape, so that it always rests against the sealing surface with a certain pressure and can also apply the restoring force simultaneously when the sealing surface and the matching surface are inclined at an angle to one another. The annular loop located between the two surfaces is always pressed in the direction in which the end loop with the greater radius is located, and it is possible to connect this annular loop with a body on which the actuating force acts, said force then having to act only in one direction, namely, opposite to the restoring force of the annular loop itself.

It has also been found especially advantageous according to other preferred embodiments of the invention to install two annular loops between the sealing and matching surfaces, said loops being fastened together at one point on their circumferences, because this design produces a much more sensitively operating valve body element, which also permits a simple arrangement of the actuating element, namely, when a plate which serves as a stop on the housing is located between the circumferential areas which are fastened together, said plate being provided with a part made of magnetic material. The stop then serves, on the one hand, to delimit the return movement of the two annular loops and on the other hand, as an actuating element when magnetic forces are applied.

There are two basic ways in which the magnetic drive can be provided in accordance with preferred embodiments of the invention. If the magnetic lines of force flow at right angles to the direction of movement of the two annular loops, the magnetic part can advantageously consist of two tabs projecting into the space enclosed by one annular loop, said tabs being located approximately in the direction of movement and at right angles to the above-mentioned plate mounted between the annular loops. When the tabs are either themselves placed at a small angle to the plane which is located at right angles to the plate and in the direction of movement, or are provided with a correspondingly bent area, when a magnetic field is applied and the magnetic matching surfaces of a magnetic yoke are appropriately arranged, very simple and effective actuation becomes possible. In arrangements where the magnetic lines of force run in the direction of movement, a simple design is produced by the magnetic part being a rod located in the area surrounded by one annular loop. This embodiment also has the advantage that two or more double loops can be located in the same magnetic field, said field being produced externally. In this embodiment, for example, two double loops can be provided, said loops being held parallel to one another in a guide part, said part being surrounded by a common magnet part. One double loop can have the magnetic rod located in the vicinity of one end loop and the other at the opposite end loop. If each double annular loop is then subjected to a restoring force which acts in a direction opposite to the other, which is possible either as a result of an appropriate angular positioning of the sealing and matching surfaces, as mentioned above, or by the arrangement of restoring springs, this design can produce an embodiment of a valve which has all of the connections on one side, but some of the openings are closed when the magnet is energized and the others are open. This embodiment therefore permits the design of multi-path valves, especially if the openings in the housing to be closed are connected appropriately with one another or if more than two double-loop pairs are provided.

The invention also provides the possibility of manufacturing a valve with only one annular loop, which simultaneously closes some of the openings while opening others, if an opening is provided in the vicinity of one end loop and another in the area of the other end loop. Finally, it is also contemplated to provide the sealing surfaces with a plurality of inlet or outlet openings located at right angles to the direction of movement, whereby, on the one hand, the throughput or the nominal width can be increased without increasing the stroke and, on the other hand, there is still the possibility of providing a row of openings in the vicinity of one end loop, and a portion, preferably half of these openings, being designed to supply the medium to be controlled and the other part serving to remove the medium from the housing, so that flow paths with a large nominal width can be opened or closed when the annular loop is unrolled. When the covered and/or exposed opening parts are divided into inlet and outlet halves, the valve system operates in a directionally neutral manner with respect to influx and pressure. This design can also be implemented by disposing a number of openings at each of the two end loops according to yet further preferred embodiments of the present invention.

These and further objects, features and advantages of the present invention will become more apparent from the following description when taken in connection with the accompanying drawing which shows, for purposes of illustration only, several embodiments in accordance with the present invention, and wherein:

BRIEF DESCRIPTION OF THE DRAWINGS

FIG. 5 is a top view of the base plate of the valve in FIGS. 1 to 4;

FIG. 6 is a partial side view showing details of the valve body of the embodiment of FIGS. 1-8, constructed of two annular loops made of elastic material, connected together;

FIG. 7 is a top view of the valve body in FIG. 6;

FIG. 8 is a sectional view through FIG. 6 along line VIII—VIII;

FIG. 9 is a cross-sectional view through another embodiment of a solenoid valve designed according to the invention;

FIG. 10 is a cross-sectional view along line X—X in FIG. 9;

FIG. 11 is a top view of the valve in FIG. 9;

FIG. 12 is an enlarged schematic view which shows one of the two valve bodies of the embodiment of FIG. 9, constructed with two annular loops connected together; and FIG. 13 is a cross-sectional view through the valve body in FIG. 12 along line XIII—XIII.

DETAILED DESCRIPTION OF THE DRAWINGS

Figure 1:
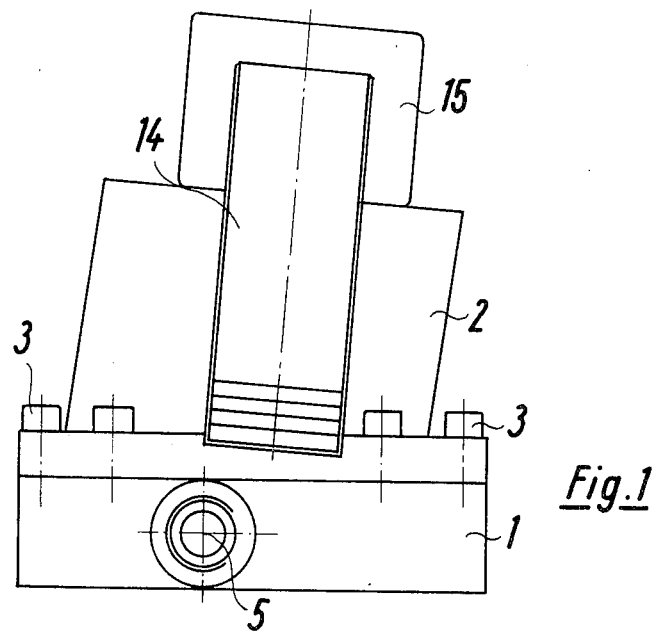
FIG. 1 is a side view of a solenoid valve arrangement constructed in accordance with a preferred embodiment of the present invention wherein the electromagnetic lines of force run at right angles to the direction of movement of the valve body.
Figure 2:
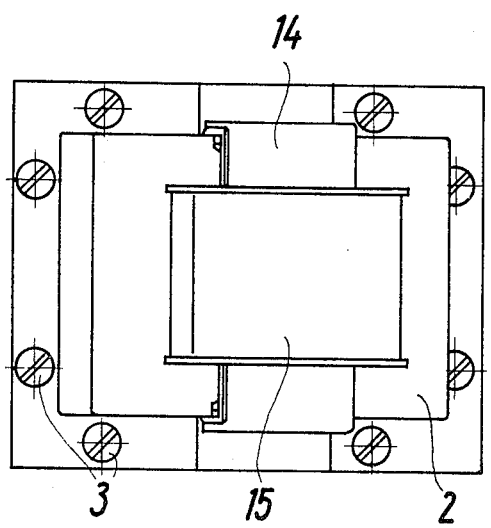
FIG. 2 is a top view of the valve in FIG. 1.

FIGS. 1 to 4 show a solenoid valve which can be used, for example, as the pilot valve to control larger pneumatic valves. The valve consists of a base plate 1, on which a hood-shaped housing part 2 is mounted. Housing part 2 is connected to base plate 1 by bolts 3. Connecting bores 4 and 5 (and 5a only schematically depicted in FIG. 3 by dash line) are provided in base plate 1, said bores being connectable to fluid pressure supply or pressure outlet lines. Connecting bore 5 is accessible laterally from base plate 1, while connecting bore 4 passes through base plate 1 from below and extends into valve chamber 6, said chamber being formed inside hood-shaped upper part 2. Connecting bores 5 are provided with connecting bores 7, which terminate at the surface 8 of base plate 1. This surface 8, as will be described hereinbelow, constitutes the sealing surface of the valve.

In valve chamber 6, two annular loops 9 and 10, shown in detail in FIGS. 6 to 8, are mounted, said loops consisting, for example, of one or more stacked metal bands, whose ends are overlapped to form loops 9 and 10. Both annular loops are connected on the sides facing one another by at least one screw 11, said screw simultaneously serving to fasten two plates 12, said plates each having laterally elevated legs 13, said legs being formed into tabs, said tabs being mounted essentially perpendicular to plate 12 and being arranged to run in the direction of movement of plate 12. As is shown in detail in FIGS. 6, 7, and 8, tabs 13 are located at a small angle to this direction of movement and also to walls 2a of housing part 2. They therefore form a wedge-shaped gap with these walls 2a, said gap being important for magnetic actuation. U-shaped sheets 14 are placed around housing part 2 to form a magnetic yoke, whose legs extend nearly as far as base plate 1 and whose common web is surrounded by an electromagnet coil 15, said coil being mounted above housing part 2. In order to ensure that tabs 13 cannot rotate from their installed position relative to annular loops 9 and 10, lock pins 20 are provided, which pass through plates 12 as well as intermediate plate 16

Figure 3:
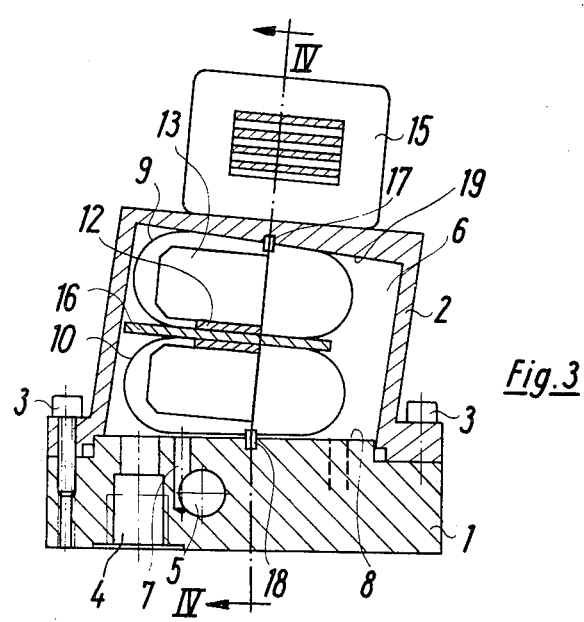
FIG. 3 is a lengthwise sectional view through the embodiment of FIG. 1, wherein a double loop is disposed as a valve body inside the housing.
Figure 4:
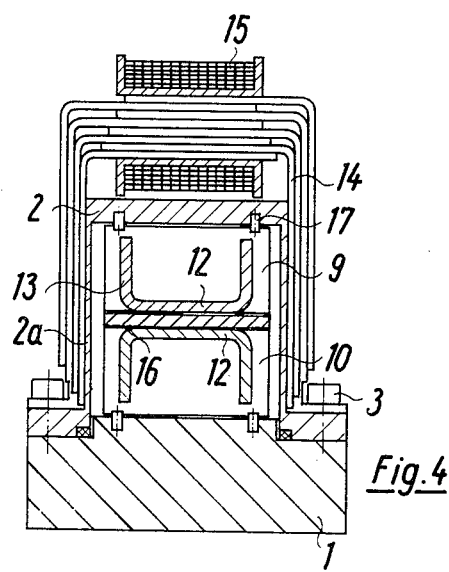
FIG. 4 is a cross-sectional view along line IV—IV through FIG. 3.

The two annular loops 9 and 10 accept between them and between plates 12, an intermediate plate 16 made of a non-magnetic material, said plate, as shown in FIG. 3, serving as an end stop for one position of the double loop formed by the two annular loops 9 and 10. In order to reach this stable end position, on the one hand, the two annular loops 9 and 10 are each connected by lock pins 17 and 18 with hood 2 and/or with base plate 1. On the other hand, support surface 19 formed inside hood 2 for annular loop 9, which serves as a matching surface for sealing surface 8, is disposed at an angle to the plane in which sealing surface 8 is located. Sealing surface 8 and matching surface 19 therefore form a sort of wedge, which grows wider toward the left, in other words, toward the side at which stop plate 16 abuts housing 2. This design ensures that, as a result of the elastic forces within annular loops 9 and 10, the double loop arrangement is forced into the left-hand end position shown in FIG. 3. In this end position, lower annular loop 10 closes openings 7. However, when electromagnet 15 is energized, the magnetic lines of force which are at right angles to the lengthwise direction of plate 16 act to draw tabs 13, which serve as armatures, into the magnetic field, aided by the diagonal position and the likewise wedge-shaped gap betweens tabs 13 and wall 2a, said gap tapering away from the magnetic field. This force moves the double loop composed of annular loops 9 and 10 rightward, and the lower annular loop 10 therefore unrolls over sealing surface 8 and exposes openings 7. Connections 5 then communicate with one another and with connector 4. Depending on the switch position, therefore, a pressure medium can be allowed to flow in or out.

FIGS. 9 to 11 show another embodiment wherein the entire valve housing consists of a guide part 21 made in one piece, said part being made piston-shaped in its lower area and being inserted from above into a corresponding opening 22 in a housing 23 or in a corresponding plate. Connecting bores 24, 25, and 26 are provided in this housing 23, said bores being connectable in known fashion to pressure, to atmosphere, or to other pressure sources or lines. Connecting channels 27 and 28 at the periphery of guide part 21, and located in its lower part, run from these connecting openings; these connecting channels in turn run via branch channels 29 and 30 and 29a and 30a into the interior of guide part 21. Guide part 21 comprises two guides for valve bodies, said bodies being designed similarly to those described with reference to FIGS. 1 to 8 and as shown in detail in FIGS. 12 and 13. The design of these valve bodies will be described further hereinbelow. Guide part 21 is surrounded by a magnet coil 31, whose lines of force, in contrast to the first embodiment, run in the direction of movement of the valve bodies which are disposed in guide part 21. Push-on terminals 32 for the power supply to this coil 31 are designed in known fashion. Coil 31 is pushed over the outside of guide part 21, said part having an approximately rectangular cross section, and is secured in place by a clip 33, said clip passing through a slot 34 in the guide part. This design ensures that the entire guide part is also mounted on a holding plate 35, by which it is fastened to housing 23.

Inside guide part 21, two annular loops 9 and 10 are provided in each of the two guides 36 and 37, which have the same design, said loops being provided with an intermediate plate 16 and being fastened to one another. Instead of plate 12 with tabs 13, however, a rod-shaped body 38 is mounted on plate 16 and on the two annular loops 9 and 10, said rod being composed of a magnetic material. Body 38 is so located inside annular loops 9 and 10 that it does not contact the left-hand end loop 9a or 10a when the unrolling annular loops 9 and 10 are in the right-hand end position shown in FIG. 12. A stop 39 is provided on plate 16, against which stop a return spring 40 abuts, said spring, when installed (see FIGS. 9 and 10) ensuring that the corresponding double loop 9 or 10 assumes a specified end position when magnet 31 is not energized. As shown in FIG. 9, the two end positions of the double loops, which are designated separately here by 41 and 42 for the sake of clarity, are different, whereby the left double loop 41 is displaced upward and the right-hand double loop 42 is displaced downward. As a result, on the one hand, the rods 38 associated with each loop are located outside the area whichh can be traversed directly by the magnetic lines of force of electromagnet 31, and on the other hand, bores 29 and 30 in the two guides 36 and 37 are closed in one case and exposed in the other. Thus, the left-hand double loop 41 exposes the bores while the right-hand double loop 42 closes their corresponding inlet bores. When the coil is energized, an interaction occurs. Double loop 42 exposes the corresponding bores while double loop 41 closes the corresponding bores, because it is pushed downward against the action of return spring 40. By an appropriate arrangement of the connecting channels between connections 24 to 26 and bores 29 and 30, a plurality of multi-path valves can be produced in this manner. Embodiments are also contemplated wherein, instead of having only two double loops, a larger plurality of them are disposed in one magnetic field.

It is also contemplated by the present invention to have embodiments wherein individual annular loops or double loops are actuated mechanically. However, the preferred designs shown and described, especially those with double loops, are especially advantageous and suitable because of their low masses and the extraordinarily small restoring forces which need be maintained, for electromagnetic actuation.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. Valve for controlling fluid flow through at least one opening in a housing or the like comprising:
   a valve chamber defined on opposite sides by a sealing surface means having at least one fluid opening thereon and a matching surface;
   movable sealing body means guided in engagement between said matching surface and sealing surface means to selectively close and open said at least one fluid opening in dependence on the position of the sealing body means; and
   electromagnetic drive means for changing the position of said sealing body means relative to the sealing surface means;
   wherein the movable sealing body means comprises annular loops of sealing material fixedly interconnected at facing circumferential portions, a plate located between said circumferential portions, and magnetic material means carried by said plate for enabling said drive means to electromagnetically act upon said sealing body means to produce unrolling of one of said loops against the sealing surface means.

2. Valve according to claim 1, wherein the distance between the sealing plane and matching surface is less than the diameter of the sealing body means.

3. Valve according to claim 2, wherein each of the annular loops is composed of a plurality of superimposed individual bands.

4. Valve according to claim 1, wherein said electromagnetic drive means is located externally of valve chamber, said sealing body means is fully confined within said valve chamber, and said drive means acts upon said sealing body means by magnetic lines of force passing through walls defining said valve chamber.

5. Valve according to claim 2 or 4, wherein the sealing plane and matching surface are inclined at an angle to one another.

6. Valve according to claim 1, wherein each annular loop is connected to a body on which an actuating force acts.

7. Valve according to claim 1, wherein the magnetic material means comprises two tabs, each projecting into a chamber enclosed by respective one of the annular loops, said tabs being located approximately in the direction of movement and at right angles to the plate.

8. Valve according to claim 7, wherein the tabs are mounted to a small angle to one another perpendicular to the plate and in a plane located in the direction of movement.

9. Valve according to claim 8, wherein the matching surface is part of a magnetic yoke, through which the magnetic lines of force flow at right angles to the direction of movement.

10. Valve according to claims 1 or 4, wherein the magnetic part is a rod surrounded by an annular loop.

11. Valve according to claim 1 or 4, wherein electromagnetic drive means comprises an electromagnetic coil associated with the annular loops in such a manner that the magnetic lines of force run in the direction of movement of the loops.

12. Valve according to claim 10, wherein two or more double loops are located in the same magnetic field.

13. Valve according to claim 11, wherein two or more double loops are located in the same magnetic field.

14. Valve according to claim 12, wherein two double loops are provided, said double loops being mounted parallel to one another, each with a guide part, said guide part being surrounded by a common magnet part, and wherein one double loop has the magnetic rod located in the area of one end loop and the other double loop has it at the opposite end loop.

15. Valve according to claim 14, wherein each double loop is subjected to a restoring force which acts in the direction opposite to the other.

16. Valve according to claim 14, wherein the end loops not provided with rods have return springs associated with them.

17. Valve according to claim 14, wherein the guide part for the double loops is made piston-shaped and is installed as a component in a bore in the valve housing.

18. Valve according to claim 17, wherein the magnetic material means is pushed onto the piston-shaped guide part.

19. Valve according to claim 1, wherein the sealing surface means comprises one or more inlet or outlet openings located at right angles to the direction of movement of the unrollable sealing body means.

20. Valve according to claim 19, wherein a row of openings are located in the vicinity of one end loop of the annular loops.

21. Valve according to claim 19, wherein only one row of openings is provided and a portoion, of these openings serves to admit the medium to be controlled and another portion serves to carry the medium out of the housing.

22. Valve according to claim 21, wherein said portion of the row of openings is half thereof.

* * * * *